US011615300B1

(12) United States Patent
Faraone et al.

(10) Patent No.: US 11,615,300 B1
(45) Date of Patent: Mar. 28, 2023

(54) SYSTEM AND METHOD FOR IMPLEMENTING NEURAL NETWORKS IN INTEGRATED CIRCUITS

(71) Applicant: Xilinx, Inc., San Jose, CA (US)

(72) Inventors: Julian Faraone, Mount Lawley (AU); Michaela Blott, Malahide (IE); Nicholas Fraser, Dublin (IE)

(73) Assignee: XILINX, INC., San Jose, CA (US)

( * ) Notice: Subject to any disclaimer, the term of this patent is extended or adjusted under 35 U.S.C. 154(b) by 1116 days.

(21) Appl. No.: 16/007,884

(22) Filed: Jun. 13, 2018

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | | |
|---|---|---|---|---|
| 5,216,751 A | * | 6/1993 | Gardner | G06N 3/063 706/42 |
| 5,311,454 A | * | 5/1994 | Canales | G06J 1/00 708/7 |
| 5,892,962 A | | 4/1999 | Cloutier | |
| 8,103,606 B2 | | 1/2012 | Moussa et al. | |
| 10,891,536 B1 | * | 1/2021 | Merkel | G06N 3/063 |
| 2005/0049984 A1 | | 3/2005 | King | |
| 2006/0212499 A1 | * | 9/2006 | New | G06F 7/575 708/200 |
| 2017/0220929 A1 | * | 8/2017 | Rozen | G06F 7/483 |
| 2018/0039886 A1 | | 2/2018 | Umuroglu | |
| 2018/0096226 A1 | * | 4/2018 | Aliabadi | G06K 9/0061 |
| 2018/0121796 A1 | * | 5/2018 | Deisher | G06N 3/0472 |
| 2019/0051291 A1 | * | 2/2019 | Yoo | G06N 3/0454 |
| 2019/0065896 A1 | * | 2/2019 | Lee | G06K 9/6251 |
| 2019/0294413 A1 | * | 9/2019 | Vantrease | G06F 17/15 |

OTHER PUBLICATIONS

Kurakin et. al., "Adversarial Machine Learning at Scale", Feb. 2017 (Year: 2017).*

(Continued)

*Primary Examiner* — Omar F Fernandez Rivas
*Assistant Examiner* — Selene A. Haedi
(74) *Attorney, Agent, or Firm* — Patterson + Sheridan, LLP

(57) ABSTRACT

A neural network system includes an input layer, one or more hidden layers, and an output layer. A first layer circuit implements a first layer of the one or more hidden layers. The first layer includes a first weight space including one or more subgroups. A forward path circuit of the first layer circuit includes a multiply and accumulate circuit to receive an input from a layer preceding the first layer; and provide a first subgroup weighted sum using the input and a first plurality weights associated with a first subgroup. A scaling coefficient circuit provides a first scaling coefficient associated with the first subgroup, and applies the first scaling coefficient to the first subgroup weighted sum to generate a first subgroup scaled weighted sum. An activation circuit generates an activation based on the first subgroup scaled weighted sum and provide the activation to a layer following the first layer.

20 Claims, 13 Drawing Sheets

(56) References Cited

OTHER PUBLICATIONS

Gregorutti et. al., "Grouped Variable Importance with Random Forests and Application to Multiple Functional Data Analysis", 2015 (Year: 2015).*

U.S. Appl. No. 15/705,033, filed Sep. 14, 2017, Fraser et al., San Jose, CA USA.

Cai, Zhaowei et al. "Deep Learning with Low Precision by Half-wave Gaussian Quantization, HWGQ", https://arxiv.org/abs/1702.00953, Feb. 3, 2017, 10 pp., Cornell University Library, Ithaca, New York, New York, USA.

Courbariaux, Matthieu et al., "Binarized Neural Networks: Training Neural Networks with Weights and Activations Constrained to +1 or -1", https://arxiv.org/abs/1602.02830, Feb. 9, 2016, 11 pp., Cornell University Library, Ithaca, New York, New York, USA.

Courbariaux, Matthieu et al., Binary Connect: Training Deep Neural Networks with binary weights during propagations, https://arxiv.org/abs/1511.00363, Nov. 2, 2015, 9 pp., Cornell University Library, Ithaca, New York, New York, USA.

Han, Song et al., "Deep Compression: Compressing Deep Neural Networks with Pruning, Trained Quantization and Huffman Coding", https://arxiv.org/abs/1510.00149, Oct. 1, 2015, 14 pp., Cornell University Library, Ithaca, New York, New York, USA.

Li, Fengfu et al., "Ternary Weight Networks", https://arxiv.org/abs/1605.04711, May 16, 2016, 5 pp., Cornell University Library, Ithaca, New York, New York, USA.

Mellempudi, Naveen et al., "Ternary Neural Networks with Fine-grained Quantization", https://arxiv.org/abs/1705.01462, May 2, 2017, 11 pp., Cornell University Library, Ithaca, New York, New York, USA.

Rastegari, Mohammed et al., "XNOR-Net: ImageNet Classification Using Binary Convolutional Neural Networks", https://arxiv.org/abs/1603.05279, 17 pp., Cornell University Library, Ithaca, New York, New York, USA.

Zhou, Shuchang et al., "DoReFa-Net: Training Low Bitwidth Convolutional Neural Networks with Low Bitwidth Gradients", https://arxiv.org/abs/1606.06160, Jun. 20, 2016, 14 pp., Cornell University Library, Ithaca, New York, New York, USA.

Zhu, Chenzhuo et al. "Trained Ternary Quantization", https://arxiv.org/abs/1612.01064, Dec. 4, 2016, 10 pp., Cornell University Library, Ithaca, New York, New York, USA.

* cited by examiner

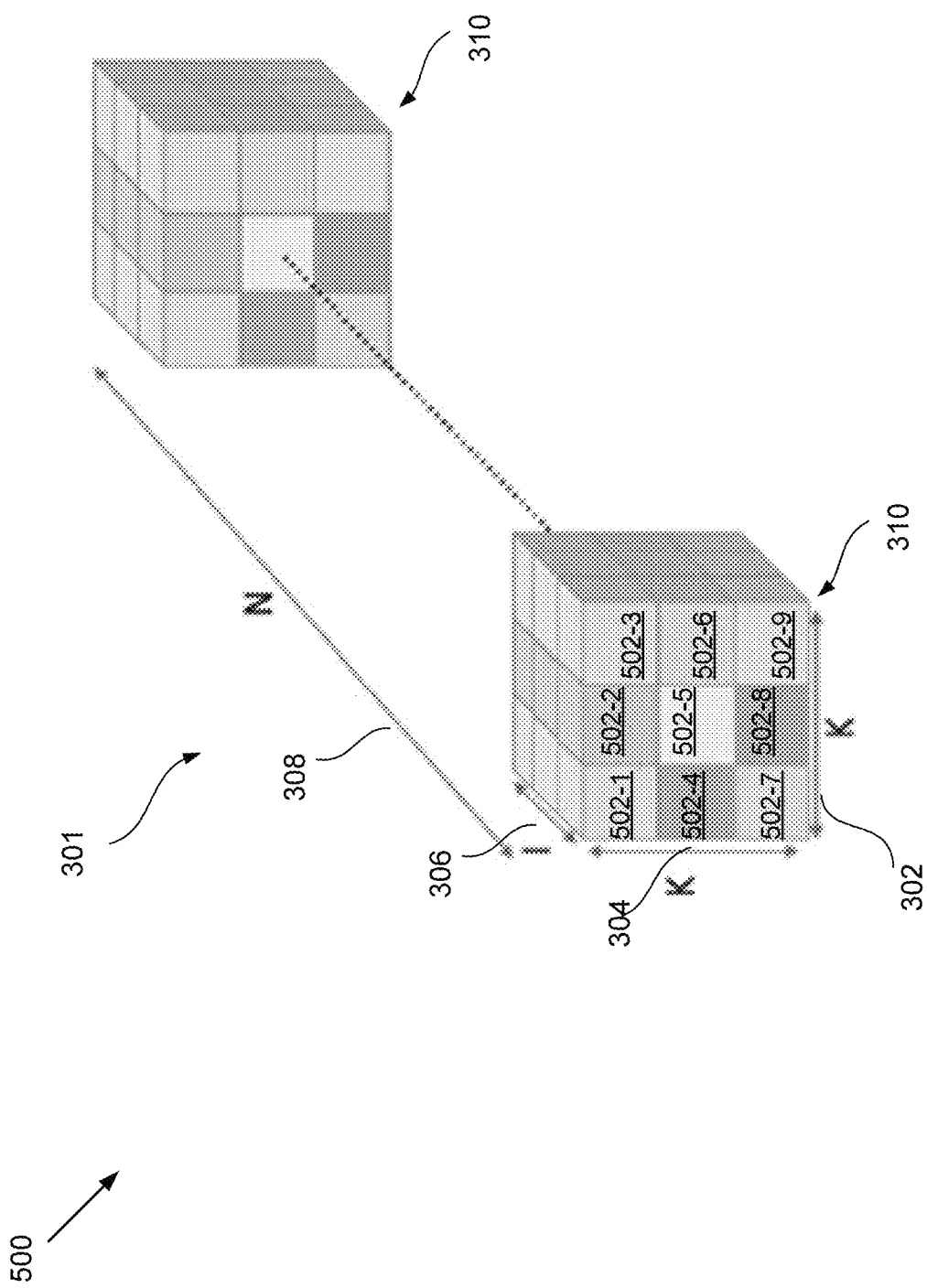

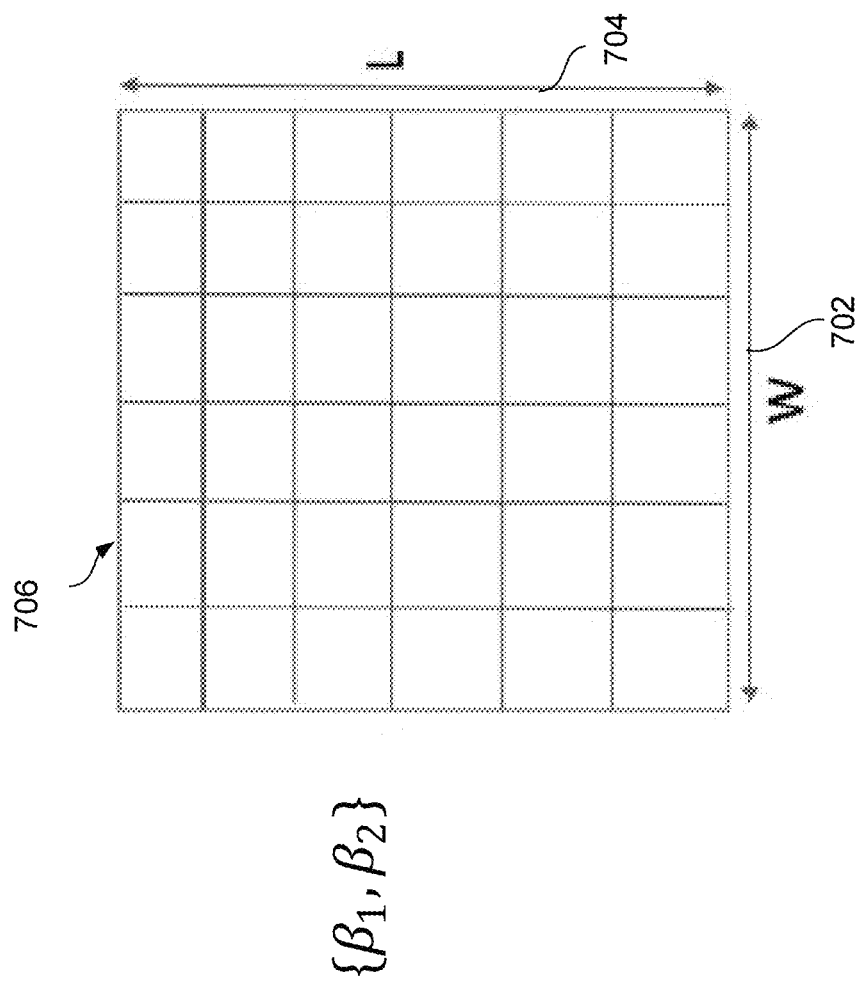

SYSTEM AND METHOD FOR IMPLEMENTING NEURAL NETWORKS IN INTEGRATED CIRCUITS

TECHNICAL FIELD

Examples of the present disclosure generally relate to integrated circuits ("ICs") and, in particular, to neural networks in ICs.

BACKGROUND

Machine learning capabilities are fast evolving. For example, neural networks (NNs) may be used in both data centers and embedded applications. As the size of a Deep Neural Networks (DNN) continues to grow to improve the prediction capabilities, its memory and computational footprints also increase, which makes the DNN more difficult to deploy in a constrained hardware environment in ICs. One method to reduce these footprints is to use a smaller number of bits to represent weights and activations in a neural network. In particular, Binarized Neural Networks (BNNs) and Ternary Neural Networks (TNNs) represent all weight parameters in DNNs with binary/ternary number representations. This may replace most multiply accumulate operations with bitwise operations, and significantly reduce the computational, spatial, and memory complexity for specialized hardware implementations for the DNN. However, BNNs often incur significant accuracy drops from their full precision counterparts for challenging datasets.

Accordingly, it would be desirable and useful to provide an improved way of implementing DNNs.

SUMMARY

In some embodiments, a neural network system includes an input layer, one or more hidden layers following the input layer, and an output layer. A first layer circuit is configured to implement a first layer of the one or more hidden layers. The first layer includes a first weight space including one or more subgroups. A forward path circuit of the first layer circuit includes a multiply and accumulate circuit, a scaling coefficient circuit, and an activation circuit. The multiply and accumulate circuit is configured to receive an input from a layer preceding the first layer; and provide a first subgroup weighted sum using the input and a first plurality of weights associated with a first subgroup. The scaling coefficient circuit is configured to provide a first scaling coefficient associated with the first subgroup; and apply the first scaling coefficient to the first subgroup weighted sum to generate a first subgroup scaled weighted sum. The activation circuit is configured to generate an activation based on the first subgroup scaled weighted sum and provide the activation to a layer following the first layer.

In some embodiments, the first layer includes a kernel filter having a size of K1×K2, and an input feature map having a size of I. K1, K2, and I are positive integers. The first weight space includes: first and second dimensions corresponding to the kernel filter and have sizes of K1 and K2 respectively; and a third dimension corresponding to the input feature map and having a size of I. The first plurality of weights have a same location in at most two of the first, second, and third dimensions.

In some embodiments, the first layer is a convolutional layer. The first weight space includes a fourth dimension corresponding to an output feature map of the convolutional layer and having a size of N, N being a positive integer.

In some embodiments, the first subgroup is a pixel-based subgroup. The first plurality of weights have a same first location in the first dimension and a same second location in the second dimension, and have different locations in the third dimension.

In some embodiments, the first subgroup is a row-based subgroup. The first plurality of weights have a same location in one of the first dimension and second dimensions, and have different locations in the other of the first dimension and second dimensions and the third dimension.

In some embodiments, the neural network system includes a second layer circuit configured to implement a second layer of the one or more hidden layers. The second layer includes a second weight space having a single layer-based subgroup. A single scaling coefficient is applied to weights of the second layer.

In some embodiments, the multiply and accumulate circuit is configured to: perform multiplications of the input and each of the first plurality of weights associated with the first subgroup in parallel to generate the first subgroup weighted sum.

In some embodiments, the scaling coefficient circuit includes: a multiplexer configured to receive one or more of scaling coefficients corresponding to the one or more subgroups respectively; a counter configured to provide a select signal to the multiplexer to select the first scaling coefficient corresponding to the first subgroup; and a multiplier configured to: multiply the first scaling coefficient with the first subgroup weighted sum to generate the first subgroup scaled weighted sum.

In some embodiments, the first layer circuit further includes: an accumulator coupled to the scaling coefficient circuit and configured to: accumulate a plurality of subgroup scaled weighted sums for the one or more subgroups to generate a second scaled weighted sum. The activation circuit is configured to generate the activation based on the second scaled weighted sum.

In some embodiments, the first plurality weights have binary or ternary values.

In some embodiments, a method includes providing an input layer and one or more hidden layers following the input layer; wherein a first layer of the one or more hidden layers includes a first weight space including one or more subgroups; receiving an input from a layer preceding the first layer; generating a first subgroup weighted sum using the input and a first plurality of weights associated with a first subgroup; providing a first scaling coefficient associated with the first subgroup; applying the first scaling coefficient to the first subgroup weighted sum to generate a first subgroup scaled weighted sum; and generating an activation based on the first subgroup scaled weighted sum and provide the activation to a layer following the first layer.

In some embodiments, the second layer is a fully connected layer.

In some embodiments, the providing the first scaling coefficient associated with the first subgroup includes: receiving, by a multiplexer, one or more of scaling coefficients corresponding to the one or more subgroups respectively; and receiving, by the multiplexer from a counter, a select signal to select the first scaling coefficient corresponding to the first subgroup.

In some embodiments, the method includes accumulating a plurality of subgroup scaled weighted sums for the one or more subgroups to generate a second scaled weighted sum. The activation is generated based on the second scaled weighted sum.

Other aspects and features will be evident from reading the following detailed description and accompanying drawings.

BRIEF DESCRIPTION OF THE DRAWINGS

FIGS. 5A and 5B are block diagrams illustrating pixel-based subgrouping of weights in a layer of a neural network system according to some embodiments of the present disclosure.

FIG. 7 is a block diagram illustrating layer-based subgrouping of weights in a layer of a neural network system according to some embodiments of the present disclosure.

DETAILED DESCRIPTION

Figure 1:
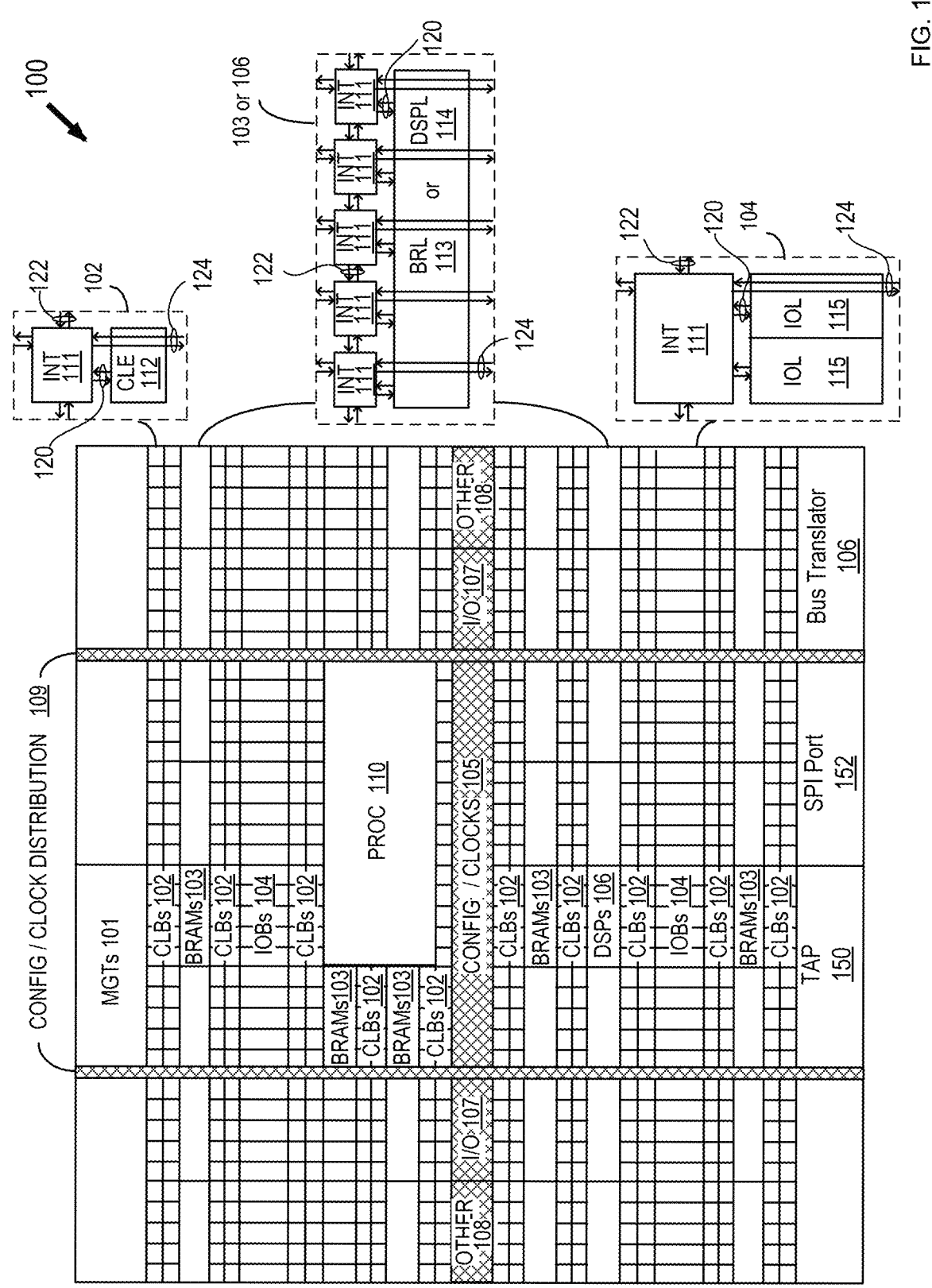
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. An artificial neural network (also referred to as neural networks below) is a model of computation inspired by the structure of brain neural networks. The neural network includes an input layer, a plurality of hidden layers, and an output layer. Each layer may include one or more basic processing elements (PEs), also referred to as neurons. These layers and their neurons are connected to each other, through which the neural network may carry out highly complex computations. An activation (e.g., an output) of a particular neuron may be obtained by applying weights to the outputs of other neurons connected to that particular neuron, generating a weighted sum of the outputs of those other neurons, and apply an activation function to the weighted sum.

In various embodiments, the neural network learns to perform its given tasks. For example, the learning involves determining the value of the weights. This process is referred to as training the neural network. In some embodiments, a backpropagation learning method may be used. The backpropagation learning method includes two processes, a forward path (forward propagation) process, and a backward path (backward propagation) process. The backpropagation learning method may calculate the error contribution of each neuron after a batch of data (e.g., in image recognition, multiple images) is processed in the forward path, e.g., using low precision (e.g. quantized) weights. Such error contribution may be calculated as the gradients of a loss function, where the error is calculated at the output layer and distributed back through the network layers in the backward path. The weights may be updated using the gradients in the backward path. In some examples, the high precision (e.g., real-value) weights are updated by the backward path. In some embodiments, in the forwarding path, scaling coefficients are applied to the weighted sum to generate a scaled weighted sum, and that scaled weighted sum is then send to the activation unit, where an activation function is applied to the scaled weighted sum to generate the activation. The scaling coefficients may be updated the in the backward path. Such scaling coefficients may improve learning capabilities by providing greater model capacity and compensating for the information loss due to quantization (e.g., binary or ternary quantization) to the weights in the forward path.

Once trained, the neural network may perform its task by computing the output of the neural network using the weights determined by the training process. This process may be referred to as the inference process. In some embodiments, once the training is complete, there is no need to keep the real-value weights, because at inference only forward propagation with the quantized (e.g. binarized weights) is performed. As such, sometimes the forward path is also referred to as the inference path.

As discussed above, while BNNs and TNNs may be used to reduce the computational, spatial and memory complexity for specialized hardware implementations of DNN, they may incur significant accuracy drops from their full precision counterpart for challenging datasets.

It has been discovered by using subgroups for weights determined based on locality of the weights, better prediction accuracy is achieved without incurring much additional hardware costs, BNNs/TNNs may be trained to improve their prediction capabilities and close the accuracy gap between full precision DNNs and BNNs/TNNs while minimally increasing the hardware complexity.

With the above general understanding borne in mind, various embodiments for implementing a neural network are described below. Various advantages may be present in various applications of the present disclosure. No particular advantage is required for all embodiments, and different embodiments may offer different advantages. One advantage of some embodiments is that by using subgroups for weights determined based on locality of the weights, irregular (different) scaling coefficients are only used on one or two dimensions of all the dimensions (e.g., a total of four dimensions) for a weight space of a particular a layer. This achieves better prediction accuracy than having one scaling coefficient for all dimensions, without significantly increasing hardware complexity. Further, it reduces the required hardware compared to a method that uses multiple scaling coefficients on each dimension. Another advantage of some embodiments is that by using more scaling coefficients (e.g., along the larger dimensions of the weight space), higher data parallelism in hardware is achieved with high accuracy for both binary and ternary networks. Yet another advantage in some embodiments is that it contributes to making DNNs perform better on FPGA devices in comparison to competitive hardware platforms. DNN training using FPGAs may use reduced power consumption (e.g., compared to GPUs), which may enable online training. Such online training may allow embedded devices of the FPGAs to continually adjust to environmental changes, and achieve accuracy and throughput tradeoffs without re-synthesis of the hardware implementation of the neural network.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or complex programmable logic devices (CPLDs). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the one or more embodiments described herein is not limited to the exemplary IC depicted in FIG. 1, and that IC having other configurations, or other types of IC, may also implement those embodiments.

In various embodiments, a DNN training process includes a forward propagation process and a backpropagation process. For training a BNN, the high precision (e.g., real-valued) weight parameters are quantized to either $\{-1, 1\}$, based on a quantization function sign(x). These quantized values are used for the inference process. The inference output is then compared to a target output. Based on the error between the forward path output and the target output, the real-valued weight parameters are updated using an optimizer (e.g., a gradient descent optimizer). After the model for the BNN is trained, the real-valued weights are discarded, and only the quantized weights are stored. For training a TNN, quantized weights with either $\{1, 0, -1\}$ are used. However, such quantized weights are inefficient to produce good accuracy on more complex datasets. Existing solutions to improve accuracy incur difficulties in specialized hardware implementation and increase hardware costs. For example, learn weight sharing is used by using separate scaling coefficients for positive and negative weight parameters. In that example, each of the weight space dimensions (e.g., four convolutional filter dimensions) of the layer uses more than one scaling coefficient. This is difficult for specialized hardware implementation, because it requires embedding the scaling coefficient in the convolution to multiply each weight by a different scaling coefficient. In another example, multiple scaling coefficients are used in each of the weight space dimensions, requiring more complicated hardware designs.

As shown in FIGS. 2 through 12, to improve accuracy without incurring much hardware costs, a method for neural network training and inference is described. During the neural network training, by using subgroups for weights determined based on locality of the weights, irregular (different) scaling coefficients are only used on one or two dimensions of all the dimensions (e.g., a total of four dimensions) for a weight space of a particular a layer. This achieves better prediction accuracy than having one scaling coefficient for all dimensions, without incurring much hardware costs. Further, it reduces the required hardware compared to a method that uses multiple scaling coefficients on each dimension. This method enables high data parallelism in hardware, and achieves high accuracy for both binary and ternary networks. Such improvements over existing neural network implementations have been shown by implementing the method in several benchmark models including, for example, AlexNet, ResNet-8, ResNet 34, and ResNet-50.

Figure 2:
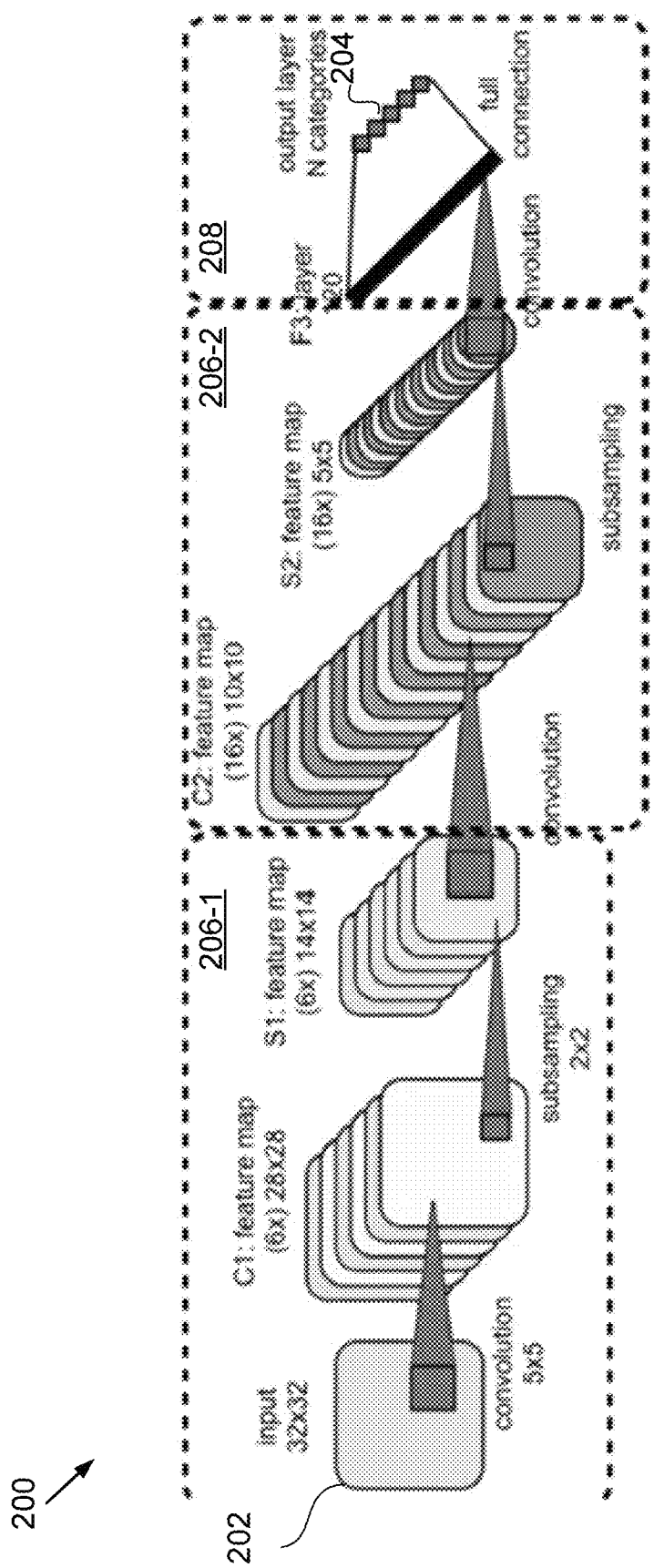
FIG. 2 is a block diagram illustrating an exemplary neural network system according to some embodiments of the present disclosure.

Referring to FIG. 2, illustrated is a convolutional neural network (CNN) 200. The convolutional neural network 200 is a class of DNNs. As shown in the example of FIG. 2, CNN 200 includes an input layer 202 and an output layer 204, hidden layers 206-1 and 206-2, and a class classifier 208. The hidden layer 206-1 includes a convolutional layer C1 and a subsample layer S1. The hidden layer 206-2 includes a convolutional layer C2 and a subsample layer S2. The class classifier 208 includes a fully connected layer F3. A convolutional layer (e.g., convolutional layer C1 or C2) may apply a convolution operation to its input, passing the result to the next layer (e.g., subsample layer S1 or S2). A subsample layer (e.g., subsample layer S1 or S2) may apply a subsampling operation to its input, passing the result to the next layer. The fully connected layer F3 connects every neuron in one layer (e.g., subsample layer S2) to every neuron in another layer (e.g., output layer 204). Because the convolutional layers are more sensitive to quantization than fully connected layers (also referred to as an inner product layer), more scaling coefficients may be used for the convolutional layers than for the fully connected layer to minimize the information loss from quantization.

Figure 3:
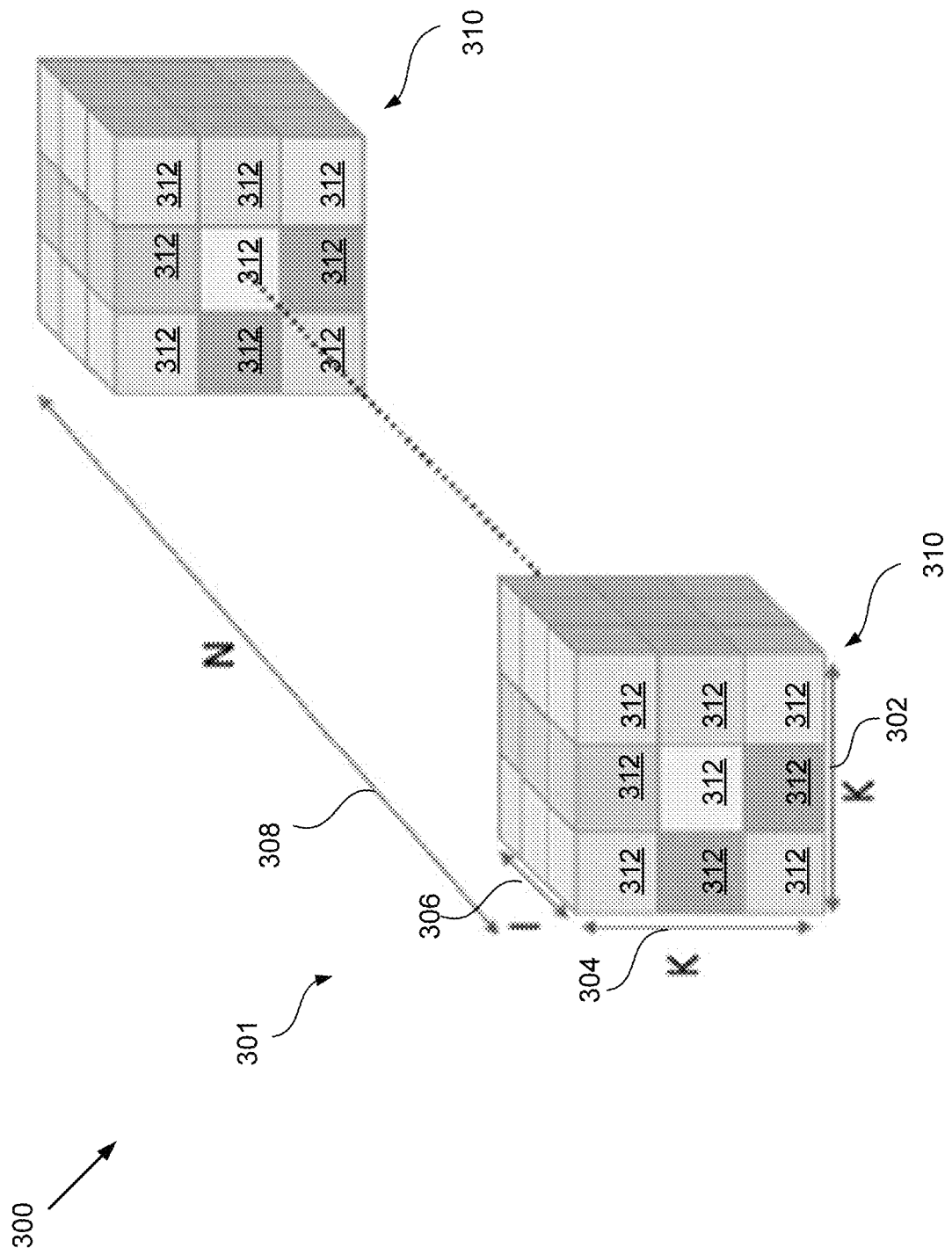
FIG. 3 is a block diagram illustrating an exemplary weight space of a layer of a neural network system according to some embodiments of the present disclosure.

Referring to the example of FIG. 3, a weight space 301 of a convolutional layer 300 (e.g., C1 or C2 of FIG. 2) is illustrated. The convolutional layer 300 includes N kernel filters 310, where each kernel filter has a size of K×K, and K and N are positive integers. The convolutional layer 300 includes weight parameters in a four-dimensional weight space 301 including dimensions 302, 304, 306, and 308. Dimensions 302 and 304 correspond to two dimensions of a K×K kernel filter 310, each having a size of K. The dimension 306 corresponds to the input feature maps (IFMs) of the convolutional layer 300, and has a size of I, the number of the IFMs, where I is a positive integer. Usually I and N are much greater than K. The dimension 308 corresponds to the N number of kernel filters 310, and has a size of N. N is also the number of output feature maps (OFMs) of the convolutional layer 300.

It is noted that while a two-dimensional K×K kernel filter 310 is used as an example, any suitable kernel filter may be used. In some examples, the kernel filter 310 may have two dimensions having sizes K1 and K2 respectively, where K1 and K2 are different positive integers. In other examples, the kernel filter 310 may have L dimensions, where L may be any suitable positive integer (e.g., greater than two).

Figure 4:
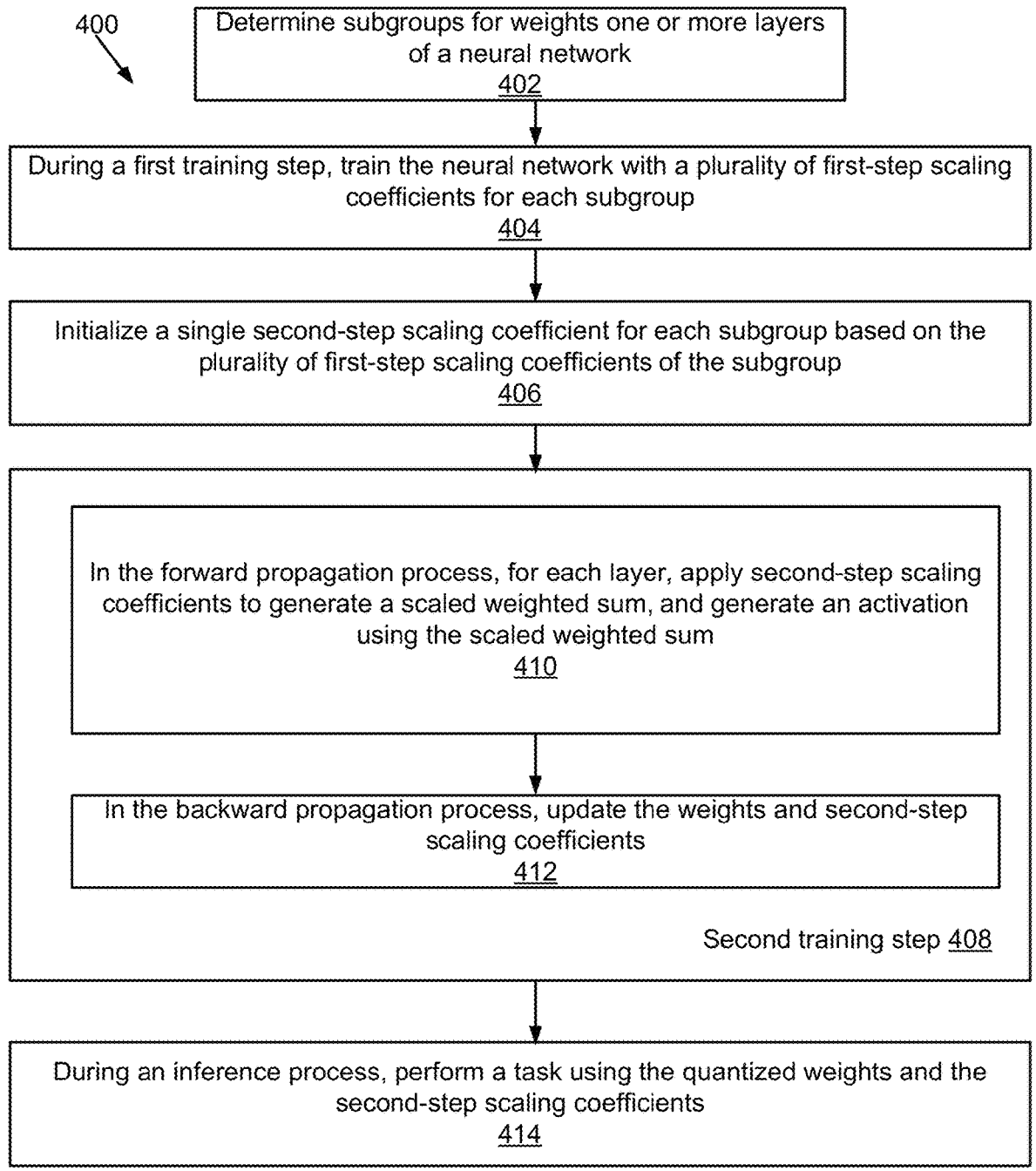
FIG. 4 is a flow diagram of a method for neural network training and inference according to some embodiments of the present disclosure.
Figure 5B:
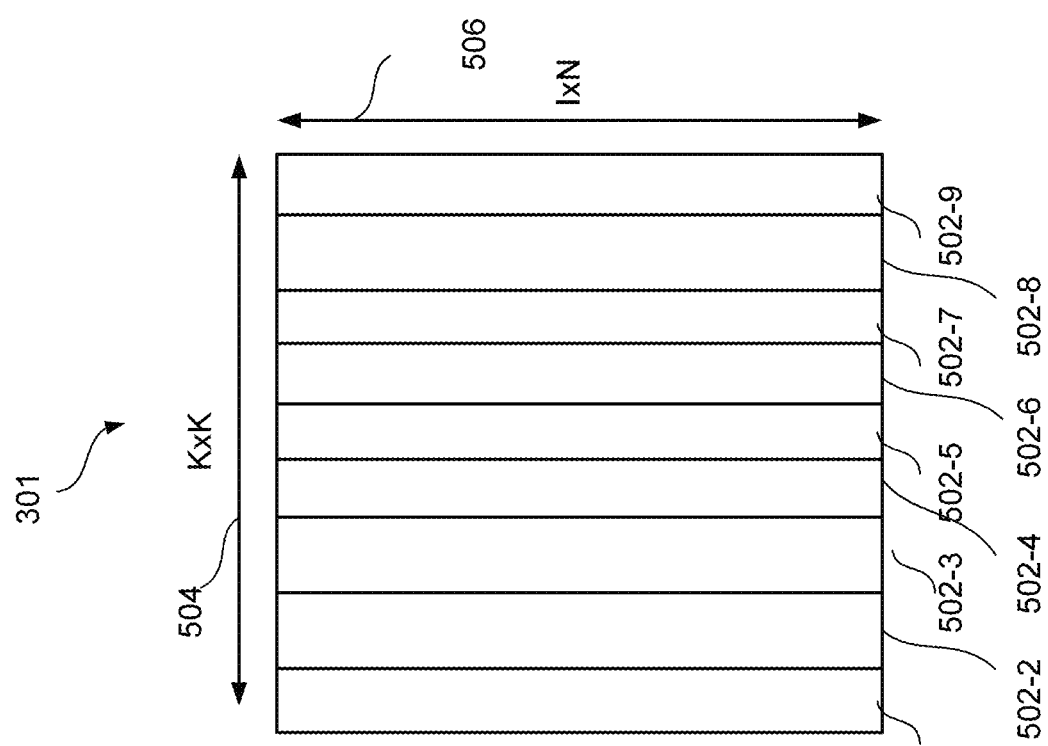
Figure 6B:
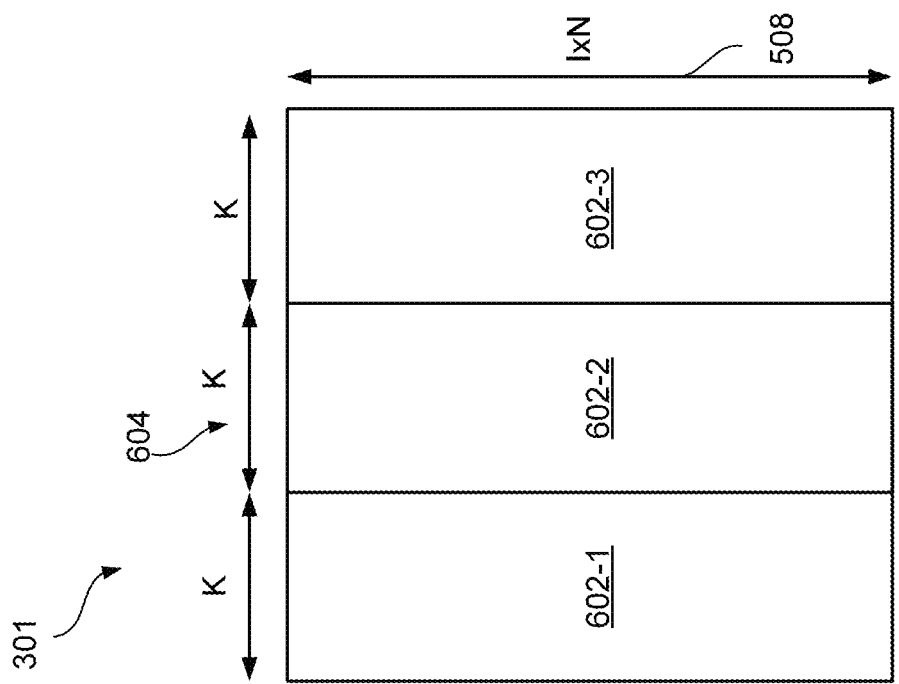
FIGS. 6A and 6B are block diagrams illustrating row-based subgrouping of weights in a layer of a neural network system according to some embodiments of the present disclosure.
Figure 6A:
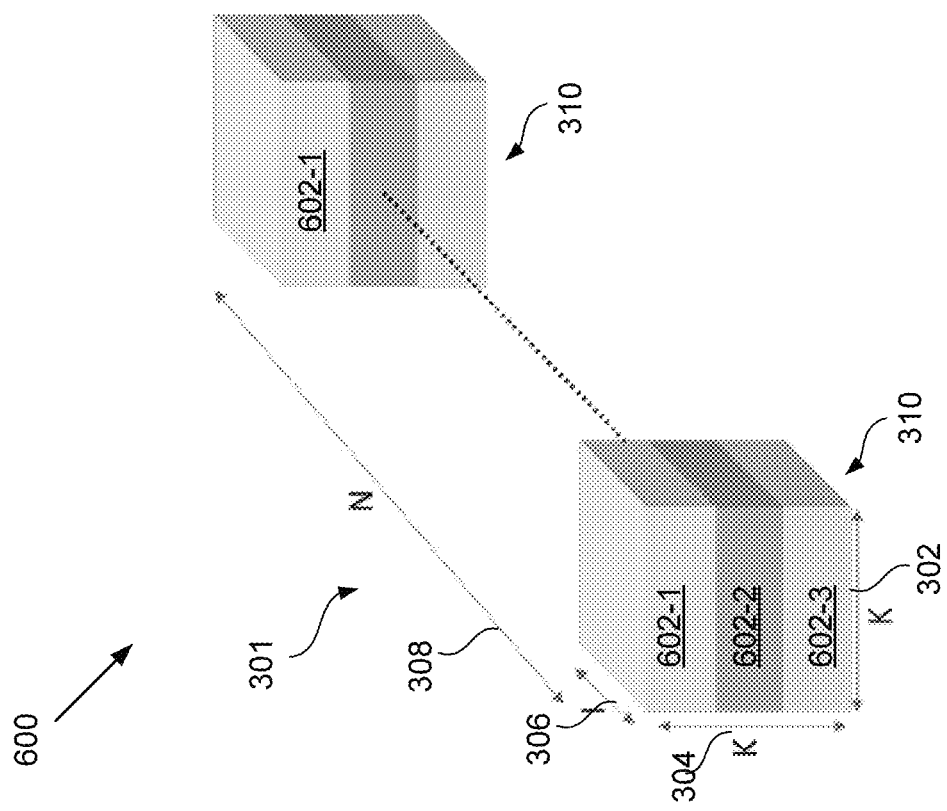

Referring to FIG. 4, a method 400 for neural network training and inference is illustrated. The method 400 of FIG. 4 begins at block 402, where subgroups for layers of a neural network are determined for scaling coefficient assignment. Referring to FIGS. 5A, 5B, 6A, 6B, and 7, at block 402, different layers may be partitioned using different subgroups with different granularities. The examples of FIGS. 5A and 5B illustrate pixel-based subgroups of a layer, FIGS. 6A and 6B illustrate row-based subgroups of a layer, and FIG. 7 illustrates a layer-based subgroup, where the entire layer is a subgroup itself.

As shown in FIGS. 5A and 5B, a layer 500 (e.g., a convolutional layer 300 of FIG. 3) is partitioned to include pixel-based subgroups 502-1 through 502-9. Each subgroup 502-$k$ includes weight parameters that have the same locations along dimensions 302 and 304 (e.g., with the same location kin the K×K filter). For example, subgroup 502-2 includes weight parameters that have a first same location (e.g., 2) along dimension 302, and a second same location (e.g., 1) along dimension 304. On the other hand, the weight parameters in the subgroup 502-$k$ may have variable locations along dimension 306 (e.g., with a location i between 1 and I) and dimension 308 (e.g., with a location n between 1 and N). In other words, by pixel-based subgrouping, all spatially equivalent pixels along the I×N dimensions are grouped in a subgroup. FIG. 5A illustrates a four dimensional convolutional layer 500, while FIG. 5B is a flattened view of the layer 500 in two dimensions 504 and 506, where dimension 504 corresponds to the flattened K×K dimension corresponding to dimensions 302 and 304, and dimension 506 corresponds to the flattened I×N dimension corresponding to dimensions 306 and 308.

As shown in FIGS. 6A and 6B, a layer 600 (e.g., a convolutional layer 300 of FIG. 3) is partitioned to include row-based subgroups 602-1 through 602-3. Each subgroup 602-$k$ includes weight parameters that have the same location k along dimension 304. For example, in subgroup 602-1, weight parameters have the same location of 1 along dimension 304. On the other hand, the weight parameters in the subgroup 602-$k$ may have variable locations along dimensions 302 (e.g., with a location k2 between 1 and K), dimension 306 (e.g., with a location i between 1 and I), and dimension 308 (e.g., with a location n between 1 and N). In other words, by row-based subgrouping, all spatially equivalent pixels along a row (or a column) (I×N×K) are grouped in a subgroup. FIG. 6A illustrates a four dimensional convolutional layer 600, while FIG. 6B is a flattened view of the weight space 301 of the layer 600 in two dimensions 604 and 508. Dimension 604 corresponds to the flattened K×K dimension, which corresponds to dimensions 302 and 304, and dimension 508 corresponds to the flattened I×N dimension, which corresponds to dimensions 306 and 308.

As shown in FIG. 7, a layer 700 (e.g., a fully connected layer F3 of FIG. 2) has a weight space including two dimensions 702 and 704. In an example, as shown in FIG. 7, weights in the entire layer 700 are in a single subgroup 706 for first-step scaling coefficients.

The method 400 proceeds to block 404, where during a first training step, the neural network is trained with multiple first-step scaling coefficients for each subgroup. In some embodiments, performing such a first training step does not affect the hardware design for performing an inference process as described in detail below. It is noted that while such a first training step may be used to improve accuracy of the neural network, in some embodiments, such a first training step is skipped.

In the examples of FIGS. 5A and 5B, each subgroup 502-k, where k is an integer between 1 and 9, may use multiple first-step scaling coefficients $\beta_{k_x}$, where x is an index to represent each scaling coefficient in the subgroup 502-k. x may have a value between 1 and X, where X represents the total number of scaling coefficients in each subgroup. In an example, each subgroup 502-k, two scaling coefficients $\beta_{k_1}$ and) $\beta_{k_2}$, where $\beta_{k_1}$ is used to scale the positive values and $\beta_{k_2}$ to scale the negative values. Similarly, in the examples of FIGS. 6A and 6B, each subgroup 602-k may use multiple first-step scaling coefficients $\beta_{k_x}$ (e.g., $\beta_{k_1}$ to scale the positive values and $\beta_{k_2}$ to scale the negative values). In the examples of FIG. 7, the subgroup 706 may use multiple first-step scaling coefficients $\beta_x$ (e.g., $\beta_1$ to scale the positive values and $\beta_2$ to scale the negative values).

In some embodiments, at block 404, the first training step may uses a first training set including a sequence of batches, where each batch is used for an iteration of training. All first-step scaling coefficients (e.g., $\beta_{k_x}$ for examples of FIGS. 5A, 5B, 6A, and 6B and $\beta_x$ for examples of FIG. 7) are updated during each batch iteration (e.g., using a backpropagation training method) of the first training step. As such, those first-step scaling coefficients may also be referred to as first-step learnable scaling coefficients.

Figure 8B:
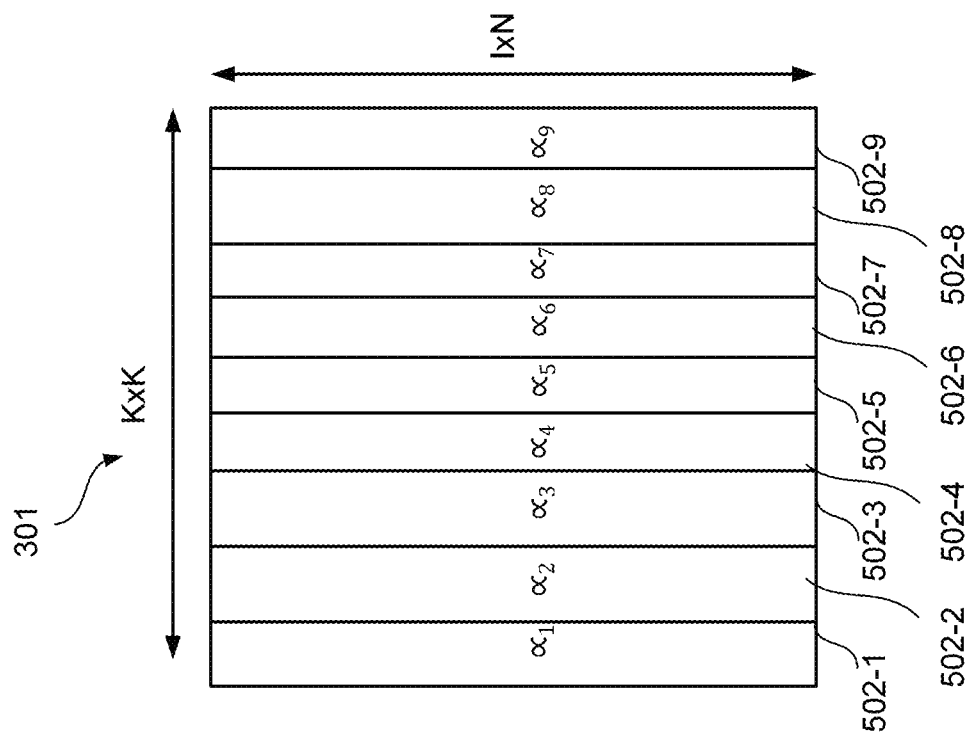
FIGS. 8A and 8B are block diagrams illustrating pixel-based subgrouping of weights in a layer of a neural network system according to some embodiments of the present disclosure.
Figure 8A:
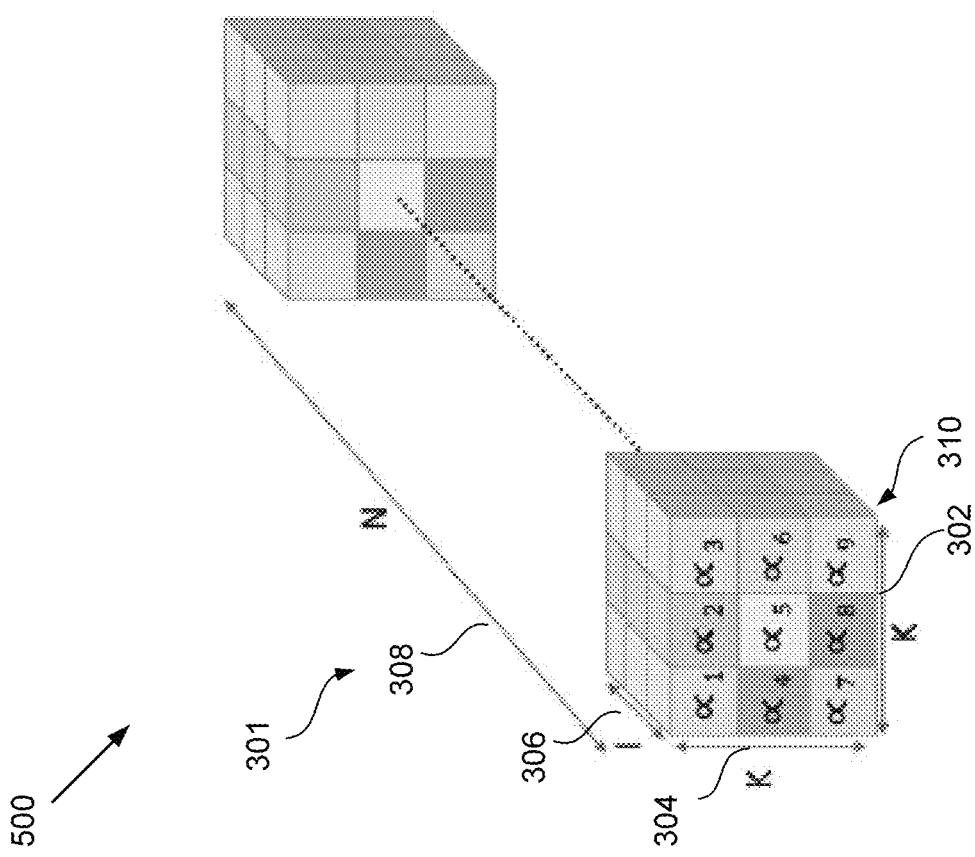

The method 400 may then proceed to block 406, where a single second-step scaling coefficient for each subgroup is initialized. Those second-step scaling coefficients may be trained using the second training step 408, and then used in the inference process 414. As such, the second-step scaling coefficients may also be referred to as inference scaling coefficients. In some embodiments, Referring to the examples of FIGS. 8A, 8B, 9A, 9B, and 10, at block 406, the second-step scaling coefficients may be initialized using the first-step scaling coefficients provided by the first training step. FIGS. 8A and 8B illustrate second-step scaling coefficients for a layer 500 (e.g., layer 500 of FIGS. 5A and 5B) with pixel-based subgroups 502-1 through 502-9. As shown in FIGS. 8A and 8B, a second-step scaling coefficient $\propto_k$ is assigned to a $k^{th}$ subgroup 502-k. The second-step scaling coefficient $\propto_k$ may be initialized using the mean of the first-step scaling coefficients in that $k^{th}$ subgroup 502-k as follows:

$$\propto_k = \frac{\sum_{x=1}^{X}\beta_{k_x}}{X},$$

where x is an index of a first-step scaling coefficient in the subgroup k, and X is the total number of first-step scaling coefficients in the $k^{th}$ subgroup 502-k.

Figure 9B:
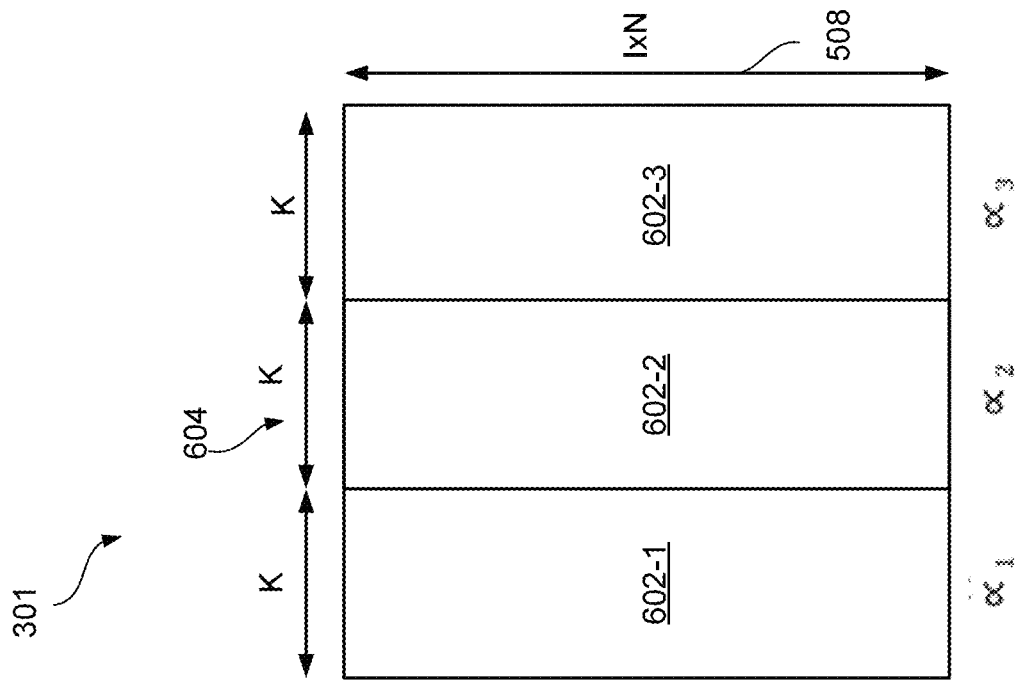
FIGS. 9A and 9B are block diagrams illustrating row-based subgrouping of weights in a layer of a neural network system according to some embodiments of the present disclosure.
Figure 9A:
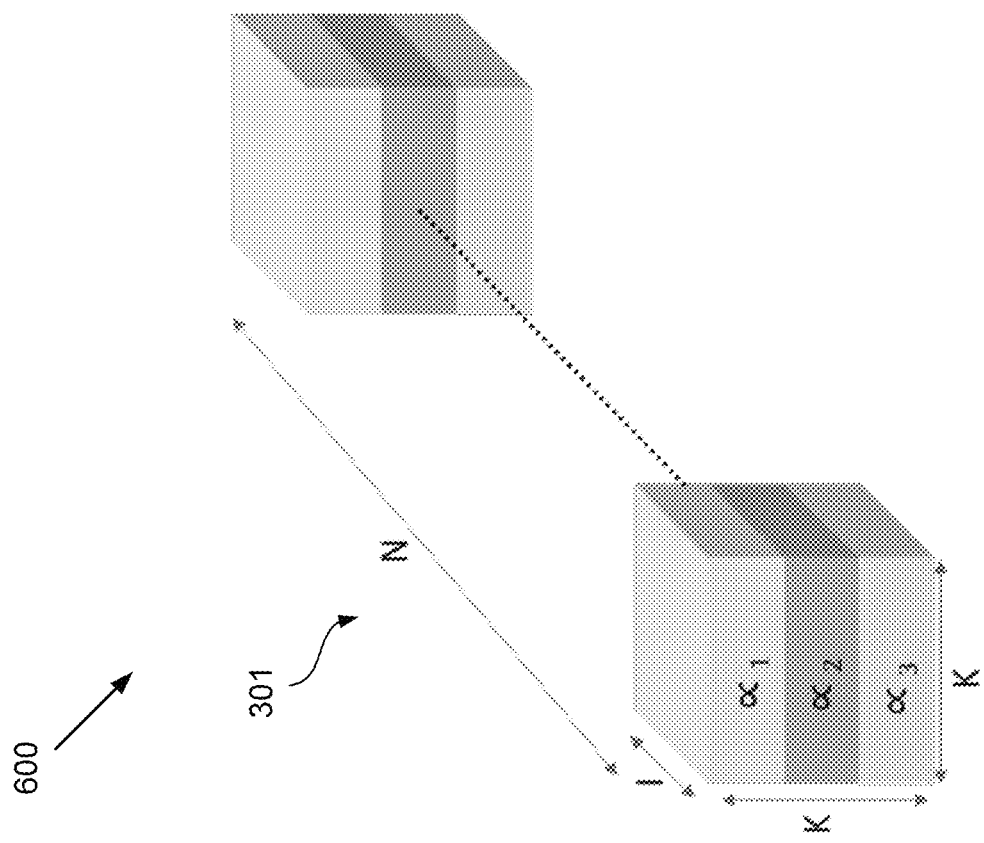

Referring to the examples of FIGS. 9A and 9B, illustrated are the second-step scaling coefficients for a layer 600 (e.g., layer 600 of FIGS. 6A and 6B) with row-based subgroups 602-1, 602-2, and 602-3. As shown in FIGS. 9A and 9B, a second-step scaling coefficient cc is assigned to a $k^{th}$ subgroup 602-k. The second-step scaling coefficient $\propto_k$ may be initialized using the mean of the first-step scaling coefficients in that $k^{th}$ subgroup 602-k as follows:

$$\propto_k = \frac{\sum_{x=1}^{X}\beta_{k_x}}{X},$$

where x is an index of a first-step scaling coefficient in the subgroup k, and X is the total number of first-step scaling coefficients in the $k^{th}$ subgroup 602-k.

Figure 10:
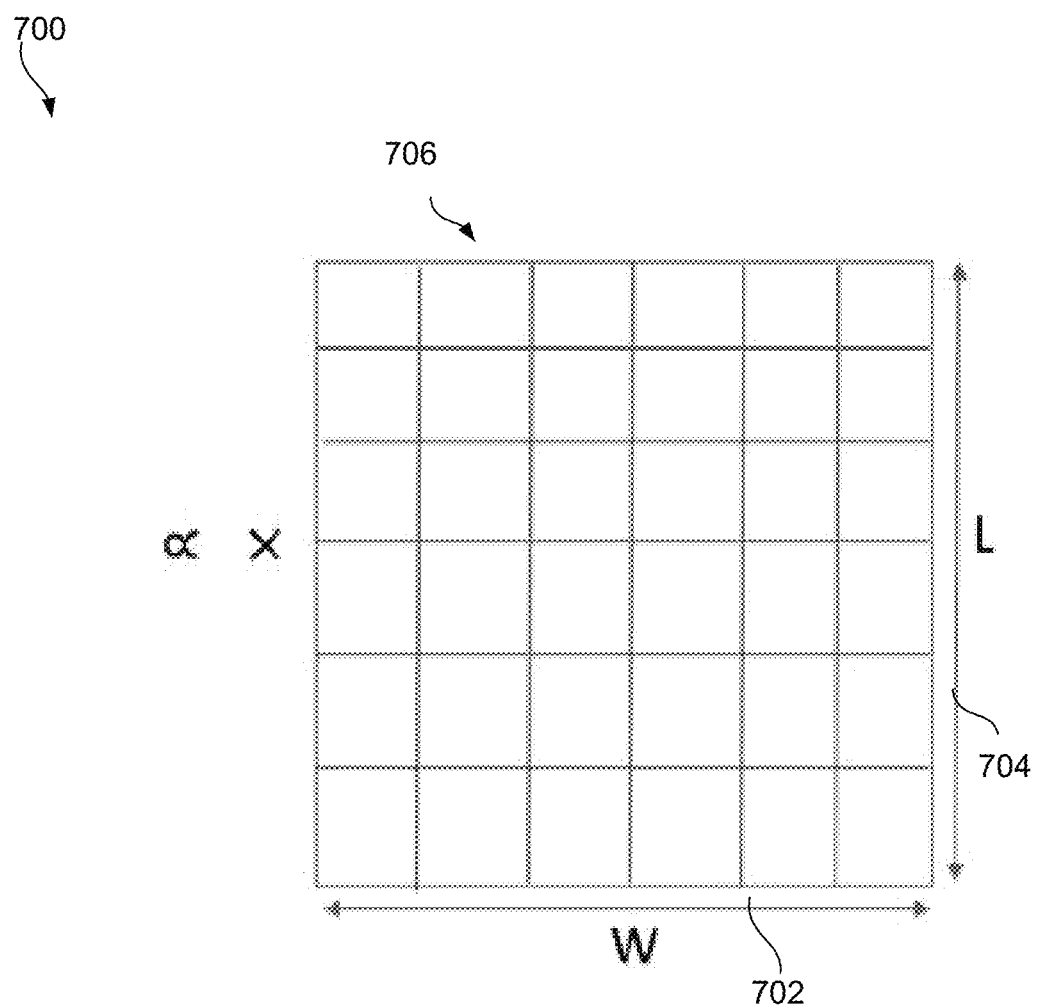
FIG. 10 is a block diagram illustrating layer-based subgrouping of weights in a layer of a neural network system according to some embodiments of the present disclosure.

Referring to the example of FIG. 10, illustrated are a second-step scaling coefficient for a layer 700 (e.g., layer 700 of FIG. 7) with layer-based subgroup 706. As shown in FIG. 10, a single second-step scaling coefficient $\propto$ is assigned to the subgroup 706. The second-step scaling coefficient $\propto$ may be initialized using the mean of the first-step scaling coefficients in the subgroup 706 as follows:

$$\propto = (\beta_1 + \beta_2)/2.$$

The method 400 may then proceed to block 408 to perform a second training step to train the neural network using the learnable second-step scaling coefficients. The second training step 408 includes blocks 410 and 412. As discussed in detail below, for each layer, block 410 may be performed by a forward path circuit of a layer circuit implementing that layer. At block 410, in the forward propagation process, the second-step scaling coefficients are used to generate a scaled weighted sum. An activation of that layer may be generated using the scaled weighted sum. Block 412 may be performed by a backward path circuit of a layer circuit. At block 412, in the backward propagation process, the weights and second-step scaling coefficients are updated (e.g., using an optimization algorithm).

Figure 11:
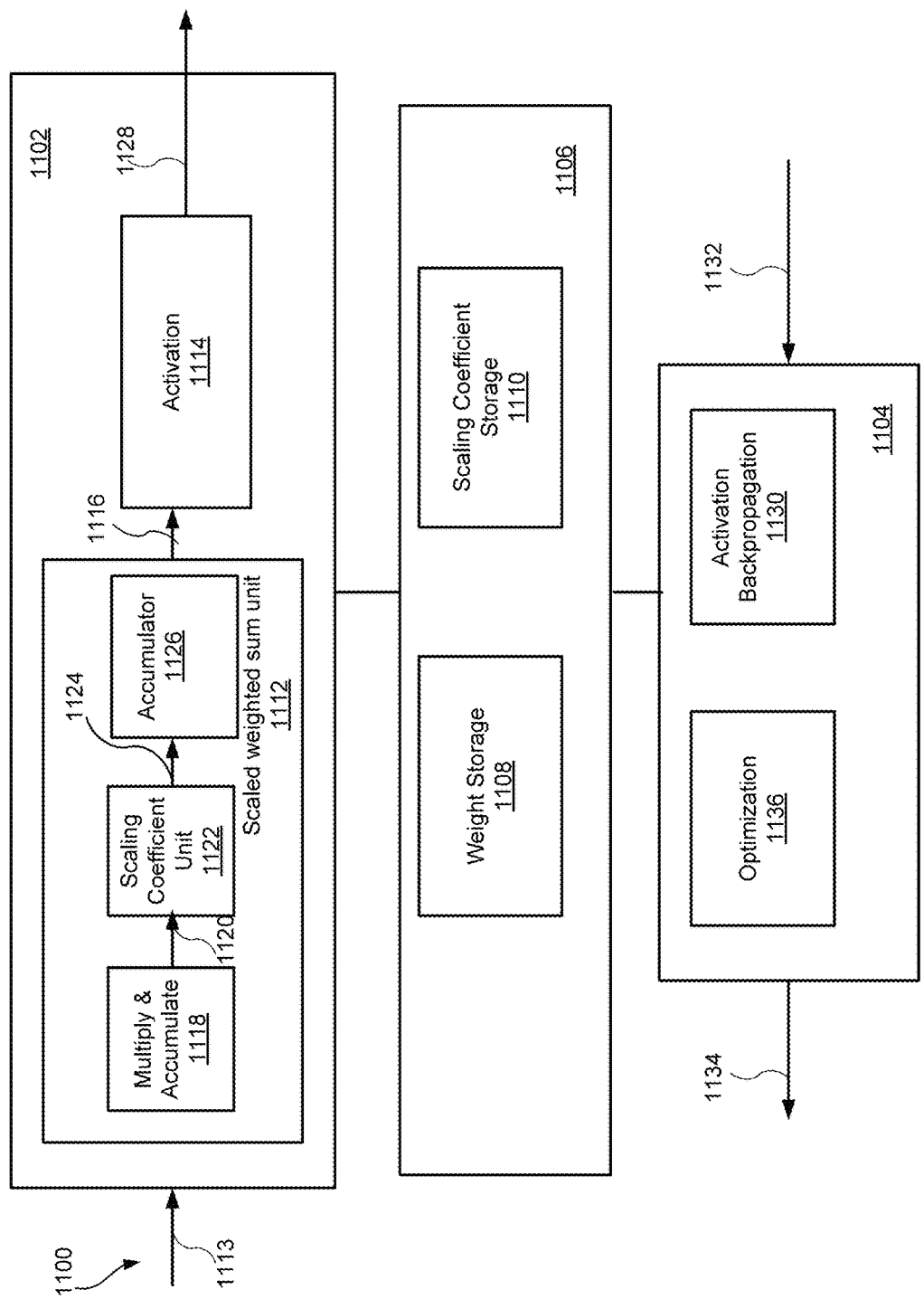
FIG. 11 is a block diagram illustrating a portion of a neural network system implementing backpropagation calculation according to some embodiments of the present disclosure.

Referring to the example of FIG. 11, illustrated is a layer circuit 1100 implementing a layer (e.g., layers 300, 500, 700, or any other suitable layer) of a neural network 200. The layer circuit 1100 includes a forward path circuit 1102 for performing forward propagation, a backward path circuit 1104 for performing backward propagation, and a storage device 1106 for storing weights and scaling coefficients.

In the example of FIG. 11, the storage device 1106 includes a weight storage device 1108 for storing weights, and a scaling coefficients storage device 1110 for storing scaling coefficients.

The forward path circuit 1102 includes a scaled weighted sum unit 1112 and an activation unit 1114. The weight storage device 1108 may provide weights to the scaled weighted sum unit 1112. The scaled weighted sum unit 1112 may generate a scaled weighted sum 1116 using activations 1113 received from a preceding layer and the weights (e.g., with quantization). In an example, a multiply and accumulate unit 1118 generates a first weighted sum 1120 using the activations 1113 and quantized weights. A scaling coefficient unit 1122 may perform a multiplication to apply a scaling coefficient corresponding to a subgroup of the weights to the first weighted sum 1120 and generate a first subgroup scaled weighted sum 1124. The first subgroup scaled weighted sum 1124 may be sent to the accumulator 1126 to generate the scaled weighted sum 1116. The activation unit 1114 may generate activations 1128 based on the scaled weighted sum 1116 and weights. The activations 1128 may then be provided to an input of the next layer.

In the example of FIG. 11, the backward path circuit 1104 may receive gradients 1132 (e.g., from the next layer or a loss function), and generate gradients 1134 (e.g., by performing an activation gradient function using an activation backpropagation unit 1130). The gradients 1134 may be provided to the preceding layer. The backward path circuit 1104 may include an optimization unit 1136 that may update the weights (e.g., real-valued weights) based on the gradients 1134 and store the updated weights in the weight storage device 1108. The optimization unit 1136 may update the scaling coefficients based on the gradients 1134, and store the updated scaling coefficients in the scaling coefficient storage device 1110. The optimization unit 1136 may use optimization algorithms including, for example, stochastic gradient descent, batch gradient descent, gradient descent, Adam, and/or any other applicable optimization algorithms.

Figure 12:
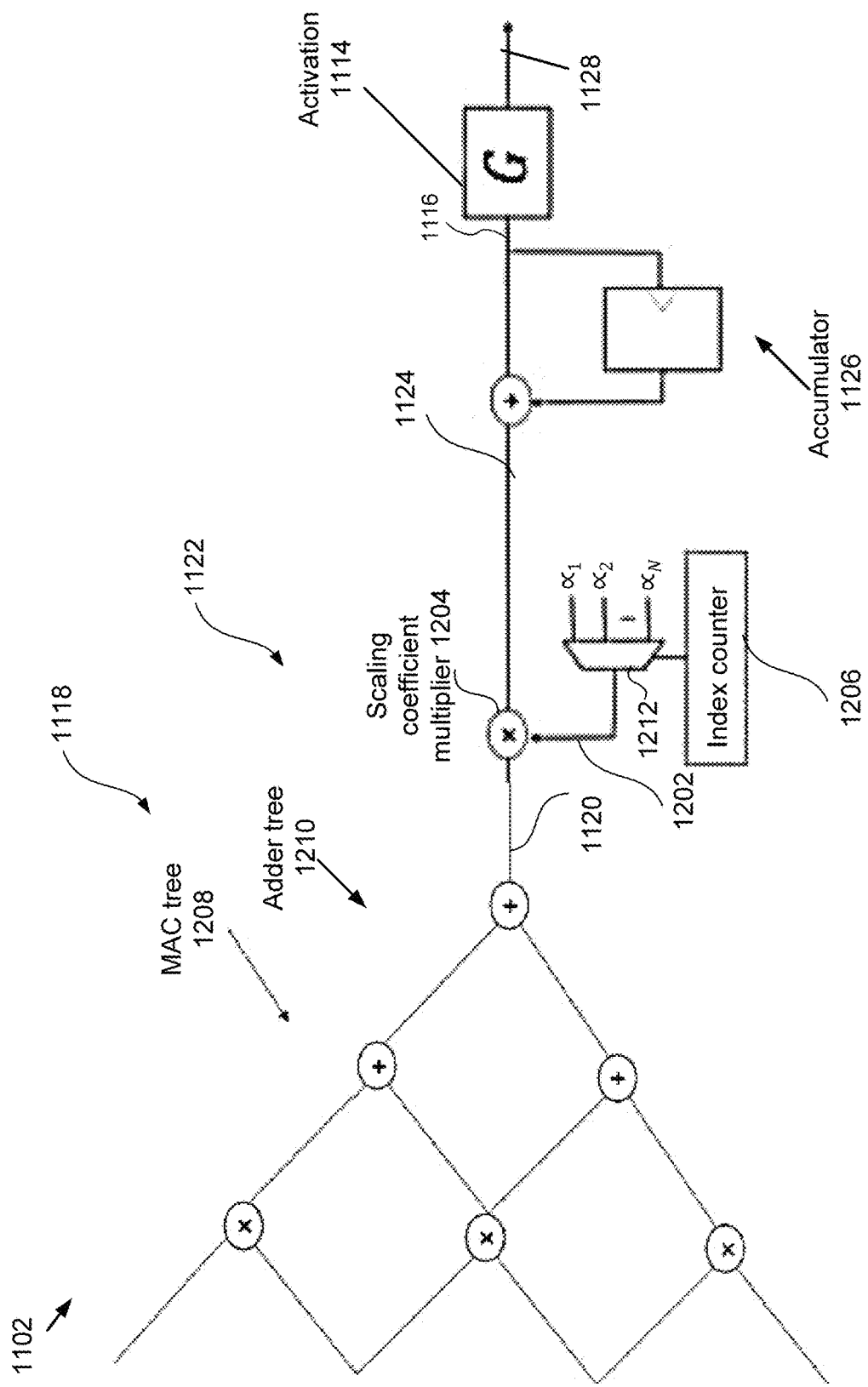
FIG. 12 is a block diagram illustrating a layer circuit implementing a layer of a neural network system using a plurality of computing units according to some embodiments of the present disclosure.

Referring to FIG. 12, illustrated is an exemplary forward path circuit 1102 of a convolutional layer circuit for a convolutional layer (e.g., a convolutional layer 300 of FIG. 3). For the convolutional layer, the operations of the multiply & accumulate unit 1118 include a sum of dot products between the input feature map and the kernel filter. The multiply & accumulate unit 1118 includes a MAC tree 1208 to perform parallel multiply-accumulate operations using a MAC tree 1208, and an adder tree 1210 following the MAC tree 1208 to sum up the outputs of the MAC tree 1208. In the example of FIG. 12, the parallelism of MAC tree 1208 and/or adder tree 1210 may dependent on the subgroups (e.g., pixel-based subgroup, row-based subgroups, layer-based sub-groups). In an example, the parallelism of MAC tree 1208 and/or adder tree 1210 is based on the number of weights in a subgroup.

In the example of FIG. 12, the scaling coefficient unit 1122 includes a single scaling coefficient multiplier 1204, a multiplexer 1212, and an index counter 1206. The first weighted sum 1120 is provided by the adder tree 1210 to a first input of the scaling coefficient multiplier 1204. The multiplexer 1212 receives the scaling coefficients $\propto_1$ through $\propto_M$, where M is the total number of subgroups of the convolutional layer. The index counter 1206 shifts the selection of the multiplier 1212 as computation for each subgroup is completed, such that the selected scaling coefficient 1202 corresponds to the correct subgroup. Such an index counter 1206 is computationally inexpensive. The scaling coefficient multiplier 1204 multiplies the selected scaling coefficient 1202 with the first weighted sum 1120 to generate a first subgroup scaled weighted sum 1124. The accumulator 1126 stores and accumulates the first subgroup scaled weighted sum 1124 (e.g., for the multiple subgroups), and provides the scaled weighted sum 1116 to the activation unit 1114. The activation unit 1114 may apply the activation function and generates the activation 1128 (e.g., output feature map).

Compared to a forward path circuit using a layer-based subgroup with a single scaling coefficient for the entire layer, forward path circuit 1102 using pixel-based or row-based subgroups also only uses one scaling coefficient multiplier with a memory slightly increased for storing the additional number of scaling coefficients. The increase in memory may be small where the scaling coefficients may be quantized (e.g., to a size of 8-bits).

The method 400 may proceed to block 414, where after the second training step 408 is completed, during an inference process, a task is performed using the quantized weights and the trained second-step scaling coefficients. In an example, after the second training step 408 is completed, the real-value weights are discarded, and only the quantized weights are maintained in the weight storage device 1108. During the inference process, only the forward path (e.g., using the forward path circuit 1102 of FIG. 12) is used. During the inference process, the level of parallelism (e.g., multiplication, addition, and/or a combination thereof) in a processor may be determined by the number of scaling coefficient subgroups. As discussed above, in some embodiments, the parallelism of MAC tree 1208 and/or adder tree 1210 is based on the number of weights in a subgroup. In an example, the total number of weights divided by the number of inputs in FIG. 12 equals to a maximum number of subgroups for a given network layer and given hardware.

It is noted that various configurations (e.g., the number and type of layers, subgroup configurations, dimensions of the kernel filter and their respective sizes, K, K1, K2, I, N, and M) illustrated in FIGS. 2-12 are exemplary only and not intended to be limiting beyond what is specifically recited in the claims that follow. It will be understood by those skilled in that art that other configurations may be used. For example, a neural network may include one or more layers, each of the layers may use pixel-based subgroups, row-based subgroups, and layer-based subgroups. In an example, a neural network includes a layer using pixel-based subgroups, a layer using row-based subgroups, a layer using a layer-based subgroup, and/or a combination thereof. The type of subgroups for a particular layer may be determined based on the accuracy requirements and/or hardware cost requirements of that particular layer. In various embodiments, by using irregular (different) scaling coefficients only along the K dimension (e.g., with row-based subgroups) or only along K×K dimensions (e.g., with pixel-based subgroups) but using regular (the same) scaling coefficient along the I×N dimensions (e.g., typically much larger than the K×K dimensions) for a particular layer, high accuracy is achieved without incurring much more hardware cost. Further, higher potential parallelism in the hardware implementation for a particular layer is achieved by using more regular scaling coefficients (e.g., along the I×N dimensions). Further, while BNNs and TNNs are used as examples, the system and method for neural network training and inference may be implemented using any other types of suitable neural networks (e.g., wherein weights of the neural networks are stored using one or two bits).

One or more elements in the various embodiments may be implemented by software, hardware (e.g., an application specific integrated circuit (ASIC), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device, The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A neural network system, comprising:
   one or more hardware circuits configured to perform a method comprising:
   providing a first layer of one or more hidden layers, wherein the first layer includes a first weight space including one or more subgroups receiving an input from a layer preceding the first layer;
   generating a first subgroup weighted sum using the input and a first plurality of weights associated with a first subgroup of the one or more subgroups;
   performing a first training step using first-step scaling coefficients for the first subgroup;
   generating a single, second-step scaling coefficient for the first subgroup based on the first-step scaling coefficients;
   performing a second training step using the single, second-step scaling coefficient for the first subgroup to generate a first subgroup scaled weighted sum;
   generating an activation based on the first subgroup scaled weighted sum; and
   providing the activation to a layer following the first layer.

2. The neural network system of claim 1, wherein the first layer includes a kernel filter having a size of K1×K2, and an input feature map having a size of I,
   wherein K1, K2, and I are positive integers,
   wherein the first weight space includes:
     first and second dimensions corresponding to the kernel filter and have sizes of K1 and K2 respectively; and
     a third dimension corresponding to the input feature map and having a size of I; and
   wherein the first plurality of weights have a same location in at most two of the first, second, and third dimensions.

3. The neural network system of claim 2, wherein the first layer is a convolutional layer, and
   wherein the first weight space includes a fourth dimension corresponding to an output feature map of the convolutional layer and having a size of N, N being an integer.

4. The neural network system of claim 3, wherein the first subgroup is a pixel-based subgroup,
   wherein the first plurality of weights have a same first location in the first dimension and a same second location in the second dimension, and
   wherein the first plurality of weights have different locations in the third dimension.

5. The neural network system of claim 3, wherein the first subgroup is a row-based subgroup,
   wherein the first plurality of weights have a same location in the first dimension, and
   wherein the first plurality of weights have variable locations in each of the second dimension and the third dimension.

6. The neural network system of claim 2,
   wherein a second layer of the one or more hidden layers includes a second weight space having a single layer-based subgroup, and
   wherein a single scaling coefficient is applied to weights of the second layer.

7. The neural network system of claim 1, wherein the method further comprises:
   performing multiplications of the input and each of the first plurality of weights associated with the first subgroup in parallel to generate a first subgroup weighted sum.

8. The neural network system of claim 1, wherein the method further includes:
   multiplying the single, second-step scaling coefficient with a first subgroup weighted sum to generate the first subgroup scaled weighted sum.

9. The neural network system of claim 1, wherein the method further includes:
   accumulating a plurality of subgroup scaled weighted sums for the one or more subgroups to generate an accumulated scaled weighted sum; and
   generating the activation based on the accumulated scaled weighted sum.

10. The neural network system of claim 1, wherein the first plurality of weights have binary or ternary values.

11. A method, comprising:
    providing a first layer of one or more hidden layers, wherein the first layer includes a first weight space including one or more subgroups;
    receiving an input from a layer preceding the first layer;
    generating a first subgroup weighted sum using the input and a first plurality of weights associated with a first subgroup of the one or more subgroups;
    performing a first training step using first-step scaling coefficients for the first subgroup;
    generating a single, second-step scaling coefficient for the first subgroup based on the first-step scaling coefficients;
    performing a second training step using the single, second-step scaling coefficient for the first subgroup to generate a first subgroup scaled weighted sum;
    generating an activation based on the first subgroup scaled weighted sum; and
    providing the activation to a layer following the first layer.

12. The method of claim 11, wherein the first layer includes a kernel filter having a size of K1×K2, and an input feature map having a size of I,
    wherein K1, K2, and I are positive integers,
    wherein the first weight space includes:
      first and second dimensions corresponding to the kernel filter and have sizes of K1 and K2 respectively; and
      a third dimension corresponding to the input feature map and having a size of I; and
    wherein the first plurality of weights have a same location in at most two of the first, second, and third dimensions.

13. The method of claim 12, wherein the first layer is a convolutional layer, and
    wherein the first weight space includes a fourth dimension corresponding to an output feature map of the convolutional layer and having a size of N, N being a positive integer.

14. The method of claim 13, wherein the first subgroup is a pixel-based subgroup,
    wherein the first plurality of weights have a same first location in the first dimension and a same second location in the second dimension, and
    wherein the first plurality of weights have different locations in the third dimension.

15. The method of claim 13, wherein the first subgroup is a row-based subgroup,
    wherein the first plurality of weights have a same location in the first dimension, and wherein the first plurality of weights have different locations in each of the second dimension and the third dimension.

16. The method of claim 12, wherein a second layer of the one or more hidden layers includes a second weight space having a single layer-based subgroup, and
wherein a single scaling coefficient is applied to weights of the second layer.

17. The method of claim 16, wherein the second layer is a fully connected layer.

18. The method of claim 11, further comprising:
receiving, by a multiplexer, one or more scaling coefficients corresponding to the one or more subgroups respectively; and
receiving, by the multiplexer from a counter, a select signal to select the first-step scaling coefficients corresponding to the first subgroup.

19. The method of claim 11, further comprising:
accumulating a plurality of subgroup scaled weighted sums for the one or more subgroups to generate an accumulated scaled weighted sum;
wherein the activation is generated based on the accumulated scaled weighted sum.

20. The method of claim 11, wherein the first plurality of weights have binary or ternary values.

\* \* \* \* \*